US012791008B2

(12) United States Patent
Das Neves Rodrigues et al.

(10) Patent No.: US 12,791,008 B2
(45) Date of Patent: Nov. 10, 2026

(54) ROOT CAUSE ANALYSIS OF A WIND TURBINE SYSTEM

(71) Applicant: VESTAS WIND SYSTEMS A/S, Aarhus N (DK)

(72) Inventors: Antonio Damiao Das Neves Rodrigues, Vila Nova de Gaia (PT); Arne Gormsen, Odense NV (DK); Jesper Holm, Skødstrup (DK); Martin Lange, Randers SV (DK); Annita Fyrstenberg Andersen, Aarhus V (DK); Bruno Alexandre Borges Goncalves, Vale de Cambra (PT); Oleksandr Orlenko, Aarhus V (DK); Aleksander Plombon, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 398 days.

(21) Appl. No.: 18/395,333

(22) Filed: Dec. 22, 2023

(65) Prior Publication Data

US 2024/0209838 A1 Jun. 27, 2024

(30) Foreign Application Priority Data

Dec. 23, 2022 (EP) .................................... 22216273

(51) Int. Cl.
*F03D 17/00* (2016.01)

(52) U.S. Cl.
CPC ......... *F03D 17/014* (2023.08); *F03D 17/005* (2023.08); *F05B 2260/84* (2013.01)

(58) Field of Classification Search
CPC .. F03D 17/014; F03D 17/005; F03D 17/0065; F03D 17/00; F05B 2260/84; G05B 23/0281; G05B 23/024
See application file for complete search history.

(56) References Cited

U.S. PATENT DOCUMENTS

2011/0182712 A1* 7/2011 Nayebi .................. F03D 7/043 700/287
2018/0038346 A1* 2/2018 Booth ..................... F03D 7/042
(Continued)

FOREIGN PATENT DOCUMENTS

EP 3974930 A1 3/2022

OTHER PUBLICATIONS

Yen Chia-Cheng et al., "Graph Neural Network based Root Cause Analysis Using Multivariate Time-series KPIs for Wireless Networks," NOMS 2022-2022 IEEE/IFIP Network Operations and Management Symposium, Dated: Apr. 25, 2022, pp. 1-7.
(Continued)

*Primary Examiner* — Alicia M. Choi

(74) *Attorney, Agent, or Firm* — Patterson + Sheridan, LLP; Gero G. McClellan

(57) ABSTRACT

Disclosed is a method, performed by a root cause analysis system. The method comprises obtaining operational data associated with operation of a wind turbine system in response to a fault of the wind turbine system. The method comprises determining, based on the operational data, a set of candidate root causes associated with the fault, by applying a machine learning model to the operational data. The machine learning model is configured to classify and/or locate one or more candidate root causes. The method comprises providing, based on the set of candidate root causes, output data indicative of at least one root cause of the fault of the wind turbine system.

20 Claims, 5 Drawing Sheets

(56) References Cited

U.S. PATENT DOCUMENTS

| | | | | |
|---|---|---|---|---|
| 2020/0125470 | A1* | 4/2020 | Cui | G06F 11/3452 |
| 2020/0141393 | A1* | 5/2020 | Yu | F03D 7/048 |
| 2020/0309099 | A1* | 10/2020 | Zhang | F03D 7/0292 |
| 2021/0117977 | A1* | 4/2021 | Kim | G06F 18/214 |
| 2021/0184462 | A1* | 6/2021 | Gupta | H02J 3/18 |
| 2022/0099532 | A1* | 3/2022 | Zhang | G05B 19/042 |
| 2022/0245801 | A1* | 8/2022 | Gietzen | G06T 7/0012 |
| 2022/0292666 | A1* | 9/2022 | Zhang | G05B 23/0224 |
| 2022/0341393 | A1* | 10/2022 | Wise | G06F 11/079 |
| 2023/0164156 | A1* | 5/2023 | Grossman | F03D 17/00<br>726/22 |

OTHER PUBLICATIONS

Meik Schlechtingen et al., "Wind Turbine Condition monitoring based on SCADA data using normal behavior models. Part 1: System Description," Applied Soft Computing, vol. 13, No. 1, Dated: Jan. 1, 2013, pp. 259-270.

European Patent Office, extended European Search Report for Application 22216273.7-1205 dated May 22, 2023.

* cited by examiner

| Cause | Category | P(Cause) |
|---|---|---|
| C1 | Code | 0.90 |
| C2 | Configuration | 0.62 |
| C3 | Hardware | 0.40 |
| ... | ... | ... |

| Fault | Delta | P (Fault \| Delta) |
|---|---|---|
| E1 | D1 | .90 |
| E1 | D2 | .07 |
| ... | ... | ... |

ROOT CAUSE ANALYSIS OF A WIND TURBINE SYSTEM

The present disclosure pertains to the field a wind turbine system. The present disclosure relates to a method for root cause analysis of a wind turbine system.

BACKGROUND

Wind turbine systems have event and alarm systems in place that record sets of events and/or error codes into logs. The goal is to assist professionals (e.g., service technicians, control system developers) with domain knowledge to find the root cause of a problem. However, the large quantity of error codes and textual log entries to scrutinize makes it very difficult and time consuming to discern a true root cause, even for professionals facing such problems daily.

SUMMARY

It is an object of the present invention to improve the finding of a root cause of a fault of a wind turbine system. Accordingly, it would be a benefit to provide a Root Cause Analysis (RCA) system and a method that may allow achieving a more accurate and time-efficient finding of a root cause of a fault of a wind turbine system.

Disclosed is a method performed by a root cause analysis system. The method comprises obtaining operational data associated with operation of a wind turbine system in response to a fault of the wind turbine system. The method comprises determining, based on the operational data, a set of candidate root causes associated with the fault, by applying a machine learning model to the operational data. The machine learning model is configured to classify and/or locate one or more candidate root causes. The method comprises providing, based on the set of candidate root causes, output data indicative of at least one root cause of the fault of the wind turbine system.

Disclosed is a root cause analysis system comprising a memory circuitry, a processor circuitry, and an interface, wherein the root cause analysis system is configured to perform any of the methods according to the disclosed methods.

Disclosed is a computer readable storage medium storing one or more programs, the one or more programs comprising instructions, which when executed by an electronic device cause the electronic device to perform any of the methods according to the disclosed methods.

It is an advantage of the present disclosure that the disclosed RCA system and method allow identification of a root cause for a fault by characterizing and learning complex patterns from wind turbine system WTG faults and associated logs. The disclosed technique allows narrowing down the domain of possible root causes to a set of candidate root causes. Further, the root cause system can provide a location associated with a candidate root cause of a fault within a wind turbine system. The disclosed technique is compatible with conventional wind turbine system monitoring solutions based on events and/or error codes and logging.

Overall, the disclosed technique reduces the amount of time spent troubleshooting a fault and can assist a technician into identifying root causes in a time efficient manner.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
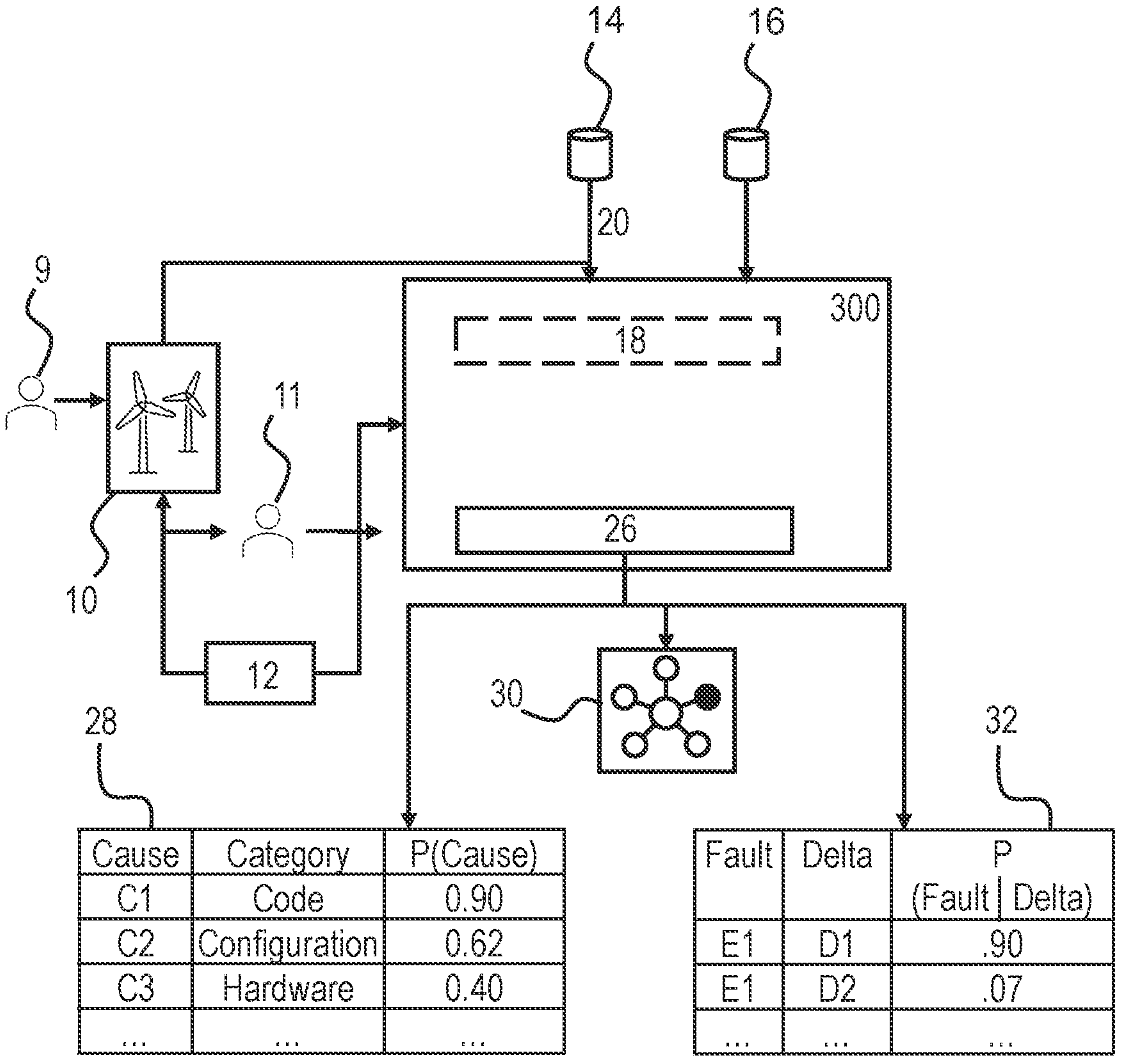
FIG. 1 is a schematic diagram illustrating an example implementation of an RCA system and related method according to this disclosure.

Various exemplary embodiments and details are described hereinafter, with reference to the figures when relevant. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

Monitoring of a wind turbine system produces operational data representative of operations of the wind turbine system. For example, the operational data includes logs, configuration data, telemetry data) and/or any other relevant data. Telemetry data may be seen as monitoring data, such as data resulting from a monitoring of the wind turbine system, e.g., via sensors, and/or data obtained via actuators. Telemetry data can include sensor data, (e.g. time series of sensor data) and/or actuator data (e.g. a time-series of angles which are passed to a motor that is capable of rotating the blades) and/or status data provided by a process running on an embedded device (e.g. states of a state machine). A log may be seen as a data structure comprising events (such as alarms, warning, collecting data etc) associated with a timestamp and optionally with a component of the wind turbine system.

A fault may occur at the wind turbine system as an anomaly and/or a malfunction of a part of the wind turbine system. The operational data represents a vast amount of information to analyze and process for finding a root cause of a fault of the wind turbine system. The present disclosure allows providing a root cause, or at least an indication, for a fault based on operational data retrieved from a wind turbine system that experiences the fault. The disclosed technique determines, based on the operational data, a set of candidate root causes, by applying a machine learning model to the operational data. The machine learning model can classify and/or locate one or more candidate root causes. The candidate root causes can be seen as potential (e.g., likely, possible, and/or probable) root causes for the fault.

The disclosed technique outputs one or more root causes for the fault based on the set of candidate root causes.

For example, the operational data can include one or more logs, configuration data, and/or telemetry data, (such as sensor data and/or actuator data and/or status data) associated with previously observed fault(s) or problem(s), with a probability p. For example, a fault can be "no power in 24V input of Controller Area Network (CAN) node x". The disclosed technique permits the identification and/or localization of a candidate root cause. In some examples, a "parent" node that is likely to be the "true" origin of the fault or malfunction can be localized, e.g., in a graph representation of the wind turbine system. In some examples, the disclosure allows pinpointing a change in a configuration between two configurations (such as a change in the code between a recently uploaded release package B and an old package A), as the candidate root cause of the fault. The configurations can be software configuration and/or hardware configurations.

It may be appreciated that the RCA system disclosed can be trained to relate patterns found in operational data to a set of faults and their root causes. The root cause of a fault can for example come from a limited set of configuration differences—or 'deltas'—between the previous and current configurations (e.g., between previous and current software releases, and/or between previous and current hardware configurations).

FIG. 1 is a schematic diagram illustrating an example implementation of an RCA system and related method according to this disclosure.

FIG. 1 shows a wind turbine system 10, an example RCA system 300, and optionally a monitoring system 12 for monitoring the wind turbine system 10. An example service technician 9 may be in communication with the wind turbine system 10 for uploading a given configuration onto the wind turbine system 10.

In some examples, the wind turbine system 10 comprises one or more wind turbines. The one or more wind turbines of the wind turbine system 10 may be seen as a group of wind turbines arranged as a wind farm or wind park.

In some examples, the wind turbine system 10 comprises a control system (e.g., a controller). In some examples, the control system is configured to operate one or more wind turbines of the wind turbine system 10. In some examples, the control system can be a central control system. In some examples, the control system can be part of a controller internal to a wind turbine.

In some examples, a wind turbine system has a configuration (e.g., a first configuration, e.g., software package A) for use during operations of the wind turbine system. For example, the configuration may be updated, after which the wind turbine system operates using the updated configuration (e.g., a second configuration, e.g., a software package B).

In some examples, an electronic device associated with the service technician 9 may be configured to transmit a new configuration (e.g., the second configuration) to the wind turbine system 10 for use by the wind turbine system 10.

After a period of time (e.g., seconds, weeks, months, etc.), a fault (such as an anomaly) may occur in the wind turbine system 10. In some examples, the fault did not occur when the wind turbine system 10 was operating using a first configuration.

In some examples, the fault of the wind turbine system 10 is detected by monitoring system 12. Monitoring system 12 is for example configured to provide fault data associated with the fault of the wind turbine system to the RCA system 300. Fault data may be seen as data representative of a fault, such as data characterizing the fault with one or more parameters, such as component type, component name, timestamp, nature of the fault, a performance value for the component in question etc. The fault data for example comprises an identification number (e.g., a model number) of the wind turbine associated with the fault.

The wind turbine system 10 may comprise the monitoring system 12. In some examples, the wind turbine system 10 does not comprise the monitoring system 12.

In some examples, an electronic device associated with the service technician 11 may be configured to provide the fault data to the RCA system 300. For example, the service technician 11 may notice the fault and provide (e.g., via an electronic device) the fault data to the RCA system 300. An RCA assistance request can include the fault data and may be sent to the RCA system 300. The fault data for example comprises a timestamp associated with the fault of the wind turbine system (e.g., the timestamp comprises information indicative of the moment a fault was detected).

In some examples, the monitoring system 12 and the RCA system 300 are part of the same electronic device (e.g., a computer).

In some examples, the monitoring system 12 and the RCA system 300 run on separate electronic devices. For example, the monitoring system 12 may be running on an electronic device associated with a technician. For example, the RCA system 300 may be running on a remote server, e.g. remote from the monitoring system 12. For example, the fault data may be transmitted via a processor of an electronic device running the monitoring system 12 to the RCA system 300. In some examples, the fault data is transmitted over a local network and/or over a wide area network (e.g., via a wired communication system and/or a wireless communication system). For example, the fault data is transmitted over a local network when the RCA system 300 runs on a local control system of the wind turbine system. For example, the fault data is transmitted over a wide area network when the RCA system 300 runs on a remote server.

As shown in FIG. 1, in response to receiving the fault data, the RCA system 300 may be configured to obtain operational data 20 associated with operation of the wind turbine system 10. The operational data 20 for example is associated with a wind turbine, identified in the fault data. The operational data 20 for example comprises logs, telemetry data, and/or configuration data. The operational data 20 may retrieved by the RCA system 300 from a repository 14, such as a database storing configuration data, logs, and/or telemetry data.

The operational data 20 may comprise operational data obtained before and/or after the moment at which the fault of the wind turbine system 10 occurred. The operational data 20 may comprise operational data obtained at the moment of occurrence of the fault. In some examples, the logs associated with a wind turbine or with the wind turbine system 10 may be retrieved from the wind turbine or the wind turbine system 10 and/or retrieved from a centralized logging system.

It may be envisaged that one or more repositories can be used to obtain operational data. In some examples, a repository may store configuration data, logs, and telemetry data. In some examples, the RCA system is configured to obtain logs, and/or telemetry data from a first repository and configuration data from a second repository. Various implementation may be envisaged.

In some examples, the RCA system 300 is configured to obtain the previous and/or recent configurations of the wind turbine system 10 as part of the configuration data. The RCA system 300 may be configured to obtain the configuration data from repository 14 or from configuration repository 16 storing configuration data (e.g., software package A and/or software package B) of the wind turbine system 10. The configuration data can include information necessary for each configuration, such as version number etc. for each release package version.

For example, the configuration repository 16 (e.g. a release package repository) may comprise configuration data indicative of previous configurations and present configurations. For example, the configuration repository 16 may comprise configuration data indicative of software configurations and/or hardware configurations of the wind turbine system 10.

In some examples, the RCA system 300 can include an RCA system core 26, and optionally a data aggregator 18.

The data aggregator 18 shown in FIG. 1 may be configured to obtain configuration data from the configuration repository 16. For example, the configuration data includes a first configuration of the wind turbine system and a second configuration of the wind turbine system (e.g. a first configuration of a wind turbine and a second configuration of the wind turbine). In some examples the first configuration may be seen as a previous configuration while the second configuration may be seen as the current configuration in use by the wind turbine system (such as of the wind turbine).

The RCA system 300 (e.g., via the data aggregator 18) can be configured to determine the difference between a first configuration of the wind turbine system and a second configuration of the wind turbine system 10. The data aggregator 18 may be configured to provide the difference to the RCA system core 26 (shown in FIG. 2). The RCA system core 26 may be configured to obtain operational data 20.

The RCA system 300 (e.g. via the RCA system core 26) determines, based on the operational data, a set of candidate root causes associated with the fault, by applying a machine learning model to the operational data. The machine learning model can classify and/or locate one or more candidate root causes. The RCA system 300 (e.g. via the RCA system core 26) provides, based on the set of candidate root causes, output data indicative of at least one root cause of the fault.

FIG. 1 shows various forms of output data indicative of at least one root cause of the fault, as provided by the RCA system 300.

For example, the output data can include a table 28 comprising candidate root causes provided by the RCA system 300. In some examples, table 28 comprises a root cause label or code (e.g., C1, C2, C3, . . . ), a category for a root cause (e.g., code, configuration, hardware, . . . ) and/or a root cause probability score P(Cause). The root cause probability score may be seen as a probability for the fault to belong to a given category of causes having the corresponding cause label.

The root cause probability score can be used for ranking the candidate root causes. In some examples, the table 28 can be in form of a ranked list of candidate root causes for the fault. Examples of candidate root causes include error in boot sequence of a specific driver, no power on an interface, etc.

The category of root causes and the root cause labels may be determined by training the RCA system 300 using one or more of: fault data, root causes associated with the fault data, relational data associated with the wind turbine, operational data, historical fault data, historical operational data associated with the historical fault data, and root causes associated with the historical fault data. Examples of categories of root causes include Code, Hardware, Configuration, etc. The categories may be expanded based on training.

The root cause probability score can combine the probabilities of the fault belonging to a given category and to a root cause code or label. Alternatively, the root cause probability score can include multiple fields, e.g., one referring to the probability of the fault belonging to a category, another referring to the probability of it belonging to a specific root cause label or code.

For example, the output data can include an example graph 30 showing a candidate root causes and a selected root cause. Graph 30 can be seen as a graphical representation of where the candidate root causes are located within a model of the wind turbine system. The N most likely locations for candidate root causes can be shown as a ranked list of 'dots' in a model graph.

For example, the output data can include a table 32 comprising confidence scores indicative of a strength of the link between the configuration difference and a fault of the wind turbine system. For example, the configuration difference is the difference between two configurations, such as the first configuration and the second configuration. In other words, table 32 may comprise a confidence score indicative of the probability that a specific difference is the cause of the fault of the wind turbine system 10. Table 32 may comprise a fault label (e.g., E1, E2, . . . ), difference label and difference probability (e.g., Delta D1, D2,), and a confidence score for the difference. For example, table 32 can be in form of a list of links between release package 'deltas' and the faults extracted from the operational data. The difference or delta may be expressed in form of {type: parameter, object: SIGNAL_433.latency, prev: 500 ms, new: 1000 ms} which represents a configuration change of the latency parameter of signal 433 from 500 ms to 1000 ms. For example, the fault code may be (1142, 'Nacelle', 4, 4, 0) for this difference. The confidence score for the difference can be a conditional probability P(Fault f given Delta d) of getting the fault f, given the occurrence of delta d.

Figure 2:
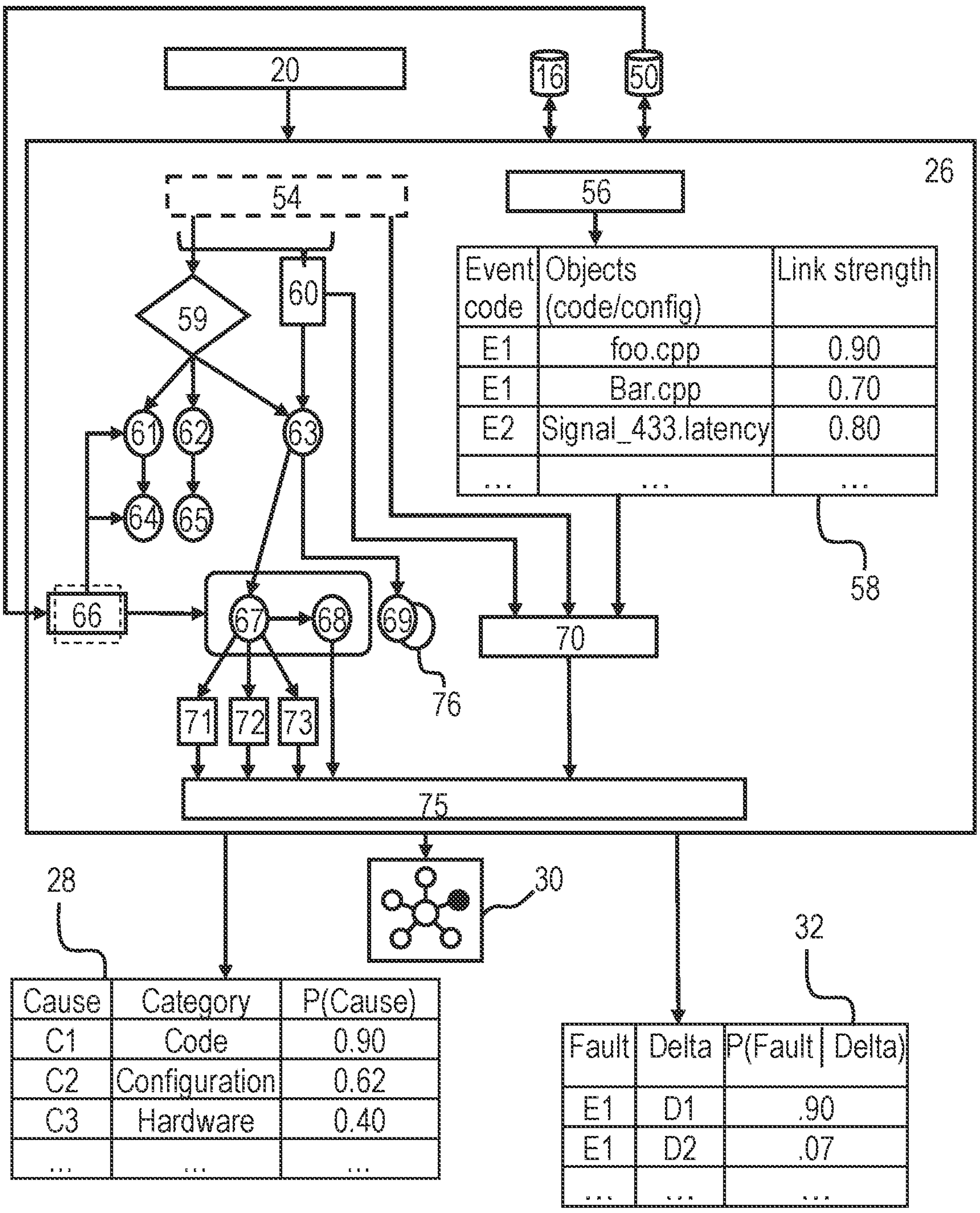
FIG. 2 is a schematic diagram illustrating an example implementation of an RCA system core according to this disclosure.

FIG. 2 is a schematic diagram illustrating an example implementation of an RCA system core according to this disclosure.

For example, the RCA system core 26 determines, based on the operational data 20, a set of candidate root causes associated with the fault, by applying a machine learning (ML) model to the operational data. The machine learning model can classify and/or locate one or more candidate root causes. The machine learning model comprises one or more of: a first machine learning model, a second machine learning model, and a third machine learning model.

In some examples, the RCA system core 26 is configured to operate according to a first machine learning (ML) model, a second machine learning model and/or a third machine learning model.

In some examples, the RCA system core 26 is configured to select a first machine learning model. In some examples, the RCA system core 26 is configured to select a second machine learning model, based on the selection of the first machine learning model. In some examples, the first machine learning model has a first order of execution, while the second machine learning model and the third machine learning model have a second order of execution lower than the first order. A hierarchy between the machine learning model may be predetermined in that the first machine learning model may be run before the second and/or third machine learning model.

The first machine learning model may be seen as a first classifier (e.g. classifier 61, 62, 63). The second machine learning model may be seen as a second classifier (e.g. classifier 64, 65, 67, 69).

In some examples, the RCA system core 26 is configured to select a first classifier. In some examples, the RCA system core 26 is configured to select a second classifier, based on the selection of the first classifier. The selection may be based on the order of execution. In other words, in some examples, the RCA system core 26 comprises a model selector 59 (e.g., top-level model selector) configured to select the first machine learning model in a set of first machine learning models. For example, the model selector 59 select first classifier 63 for a first order of execution and a second classifier 67 to be executed after running the first classifier 63.

In some examples, the RCA system core 26 is configured to select the first ML model using a model tree of multiclass ML classifiers. In some examples, the top-level model selector 59 is configured to select a branch of the model tree to follow based on the first classifier. The model tree can be used for selection of machine learning models which the top-level model selector 59 determines are most relevant, e.g. based on the type of wind turbine system (e.g. wind turbine variant) and/or based on the fault. For example, for a wind turbine variant of 2MW, the top-level tree selector 59 selects a first tree (e.g. with branch with classifier 61), while for a wind turbine variant of 4MW, the top-level tree selector 59 selects a second tree (e.g. with branch with classifier 62), etc. The type of wind turbine can be obtained from operational data 20 (e.g. metadata included in the operational data 20).

The model tree for example comprises two layers (e.g., an upper layer and/or a lower layer). The upper layer may be associated with the first ML models (such as first classifiers, such as classifiers 61, 62, 63). The lower layer may be associated with the second ML models (such as second classifiers, such as classifiers 64, 65, 67, 69). For example, the upper layer provides one or more first ML models (such as first classifiers) for classifying the observed fault into first root cause categories. For example, the lower layer provides one or more second ML models (such as second classifiers) for classifying the observed fault into second root cause categories. The second root cause categories may provide more granularity than the first root cause categories. The first ML models (such as first classifiers) may be seen as high-level category models, such as high-level classifiers. The second ML models (such as second classifiers) may be seen as low-level category models, such as low-level classifiers, in that their granularity is higher than the first ML models. In other words, the first ML models (such as first classifiers) are seen as providing coarser granularity than the second ML models. Stated differently, the second ML models (such as second classifiers) are seen as providing finer granularity than the first ML models. The first machine learning model may comprise one or more high-level category models (e.g., high level classifier models 61, 62, and 63). In some examples, a high-level category model may be seen as a high-level classifier model.

For example, the selected ML models can be seen as activated category models. For example, ML model is selected based on the operational data.

In some examples, the first machine learning model can be seen as a first classifier configured to classify the operational data into one or more first root cause categories, such as N first root cause categories where N is a positive integer. For example, the first machine learning model may determine the probability that a fault of the wind turbine system (such as wind turbine system 10 of FIG. 1) belongs to a first root cause category. In other words, the first machine learning model can be seen as a high-level classifier model configured to determine the probability that a fault of the wind turbine system belongs to a first root cause category (e.g., a high-level root cause category, a root cause category broader than the second root cause category). For example, the first root cause category may be obtained from a list of previous root causes (e.g., stored in the memory of the RCA system 300 of FIG. 1 and FIG. 5). For example, the first root cause category may be obtained from labels used to train the first ML model, such as first ML classifiers. Examples of first root cause categories include “code”, “hardware”, “configuration”, etc.

In some examples, the first, second and/or third machine learning models may be trained using operational data for a particular type of wind turbine system (e.g., 2-Megawatt wind turbine system and/or 4-Megawatt wind turbine system).

The second machine learning model may be seen as a second classifier. In some examples, the second machine learning model can be seen as a second classifier (e.g., classifier 67, 69) configured to classify the operational data into one or more second root cause categories (root cause categories 71, 72). The second machine learning model may be seen as one or more low-level category models. In some examples, a low-level category model may be seen as a low-level classifier. In some examples, the second root cause category can be seen as a low-level root cause class. The low-level category models may be configured to classify processed (e.g., processed using pre-processor 54) logs and or telemetry data into a specific second root cause category, such as 1 out of N second root cause categories (e.g., low-level root cause category).

For example, when the first root cause category is “code”, then an example second root cause category may be a part of the code used by the wind turbine system (e.g., ‘Error in boot sequence of CAN driver’ or ‘Hub checksum error in Modbus driver’). For example, when the first root cause category is “configuration” then an example second root cause category may be indicative of a specific configuration of the wind turbine system (e.g., ‘Modbus signal latency too high’ or ‘Wrong product code’).

In some examples, the third machine learning model belongs to the lower layer of the model tree. FIG. 2 shows third ML model 68 and 76. The third ML model can include a Graph Convolutional Network model configured to locate a candidate root cause based on the operational data.

For example, the RCA system core 26 may be configured to identify the location of (such as to locate) candidate root cause(s) (such as candidate root cause(s) of second root cause categories).

The graph convolutional network can be associated with the first classifier and/or the second classifier. In FIG. 2, the graph convolutional network 68 is associated with the second classifier 67. In FIG. 2, the graph convolutional network 69 is associated with the second classifier 76. The graph convolutional network (GCN) can be used to candidate root causes over a graph representation of the wind turbine system. In some examples, the graph convolutional network (GCN) can be used to locate (e.g., pinpoint) the location of the second root cause category in the graph representative of the wind turbine system. The GCN can take as input operational data and a graph representation of the wind turbine system. The graph representation of the wind turbine system can be seen as a representation of relation, such as the relation between components and signals, in a wind turbine system. In other words, the graph representation of the wind turbine system can be seen as a relation model of nodes and/or components of the wind turbine system. The GCN is positioned in the same level as the second ML models.

As shown in FIG. 2, the RCA system core 26 (e.g. part of the RCA system disclosed herein) may comprise a pre-processor 54. In some examples, the pre-processor 54 is configured to obtain the operational data 20. For example, the pre-processor 54 is configured to transform (e.g., reformat) the operational data 20 to an improved format (such as a format more compatible for application of the machine learning model) for input to the machine learning models (e.g., first, second and/or third machine learning models). For example, the transformed operational data 20 can be seen as pre-processed operational data 60. The model selector 59 can take as input the pre-processed operational data 60.

As an example, the pre-processor 54 is configured to provide pre-processed operational data 60 to a GCN model (e.g., GCN model 68 and/or 76). The GCN model for example outputs a set of wind turbine system graph nodes indicative of the location of the candidate root causes. In some examples, each second ML model is associated with a companion GCN model. For example, the pre-processed operational data 60 associated with each of selected (such as activated) second ML models may be provided to the companion GCN models.

In some examples, the probabilities and nodes in the graph that are associated with the second root-cause 71, 72, 73 are passed to a post-processor 75. For example, the post-processor 75 aggregates the information provided by different sub-systems in the RCA system core 26. In some examples, the post-processor 75 filters the candidate root causes based on their respective probabilities.

In some examples, the RCA system core 26 is configured to obtain configuration data from the configuration repository 16. In some examples, the RCA system core 26 is configured to obtain logs from a log repository 50. It may be envisaged that the log repository 50 is part of the repository storing operational data.

In some examples, the RCA system core 26 is configured to compute the links by using 'Event-Object' linking table 58. The Event-Object' linking table 58 can be learned offline by the RCA system (e.g. via link learner 56) from repositories such as repositories 16 and 50 and/or automated examination of logs.

In some examples, the RCA system core 26 is configured to process (e.g. via a delta event linker 70) the operational data 20, 60 (configurations, logs, and/or telemetry data) and establish links between the operational data and the list of Release Package (RP) 'deltas'.

The final 'Delta'-Event links are passed to the post-processor 75. This can be used to filter the list of root causes provided by 71 72, 73. This may help detect the faults that are more likely to be caused by one of the 'deltas'.

In some examples, the post-processor 75 aggregates the provided inputs, and provides a filtered list of all outputs, e.g.: a ranked list of most likely candidate root causes for the observed data, a location of the candidate root causes in the graph, and/or a table with links between 'deltas' and observed faults.

It may be envisaged that inference results of the RCA system are continuously monitored, triggering the re-training of ML model(s) in the RCA system hierarchy.

Furthermore, unsupervised learning techniques can be applied on operational data (such as logs, configuration data, and/or telemetry data) to determine if new first and/or second root cause categories need to be created.

Figure 3:
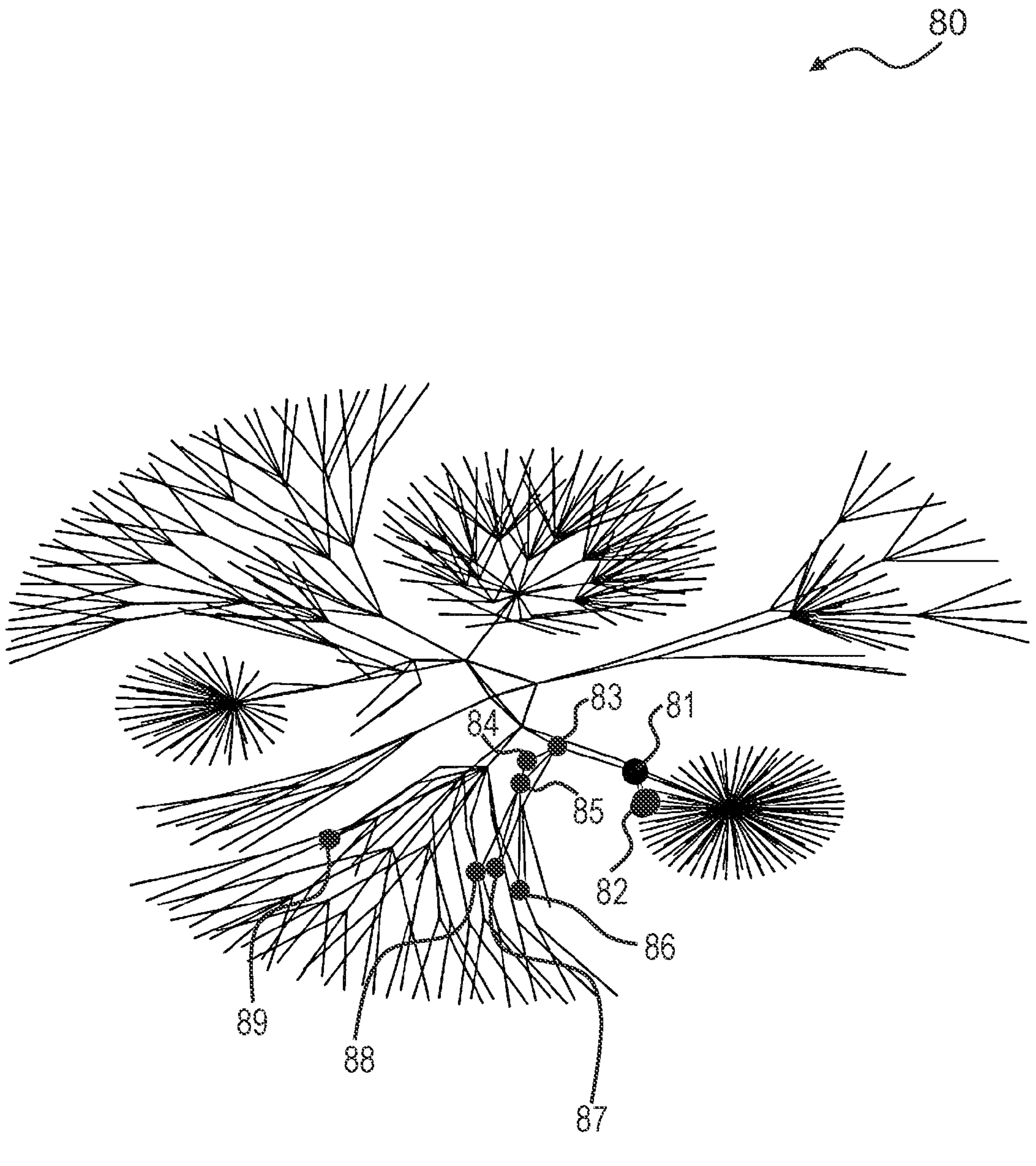
FIG. 3 is a diagram illustrating an example graph representation of a wind turbine system according to this disclosure.

FIG. 3 is a diagram illustrating an example graph representation 80 of an example wind turbine system according to this disclosure.

The graph representation 80 is an example result of an output from a graph convolutional network based on the operational data. The graph representation 80 shows the candidate root causes over a graph representation of the wind turbine system. The graph representation 80 shows locations of candidate root causes associated with a fault within the wind turbine system.

The graph representation 80 is representative of relation between nodes and/or components of the wind turbine system.

For example, nodes and/or edges 81, 82, 83, 84, 85, 86, 87, 88, 89 represent components that are connected and/or related in the wind turbine system and which are determined by the Graph Convolutional Network as candidate root causes for the fault under analysis. For example, nodes and/or edges of the graph representation 81, 82, 83, 84, 85, 86, 87, 88, 89 depict components (e.g., control components, sensors) and/or signals (e.g., control signals, sensor data) associated with the components, which are determined as candidate root cause for the fault.

For example, node 82 represents a signal from a component. For example, node 85 may be a processing or computing node (e.g., an embedded processor or computer running an embedded operating system) onto which multiple sensors are connected. For examples, node 85 can be seen as a 'top-level' node, to which leaves, and leaf parents are connected. In some examples, node 85 can represent a sensor unit which measures multiple signals (this would be a node to which many leaves are connected).

Figure 4:
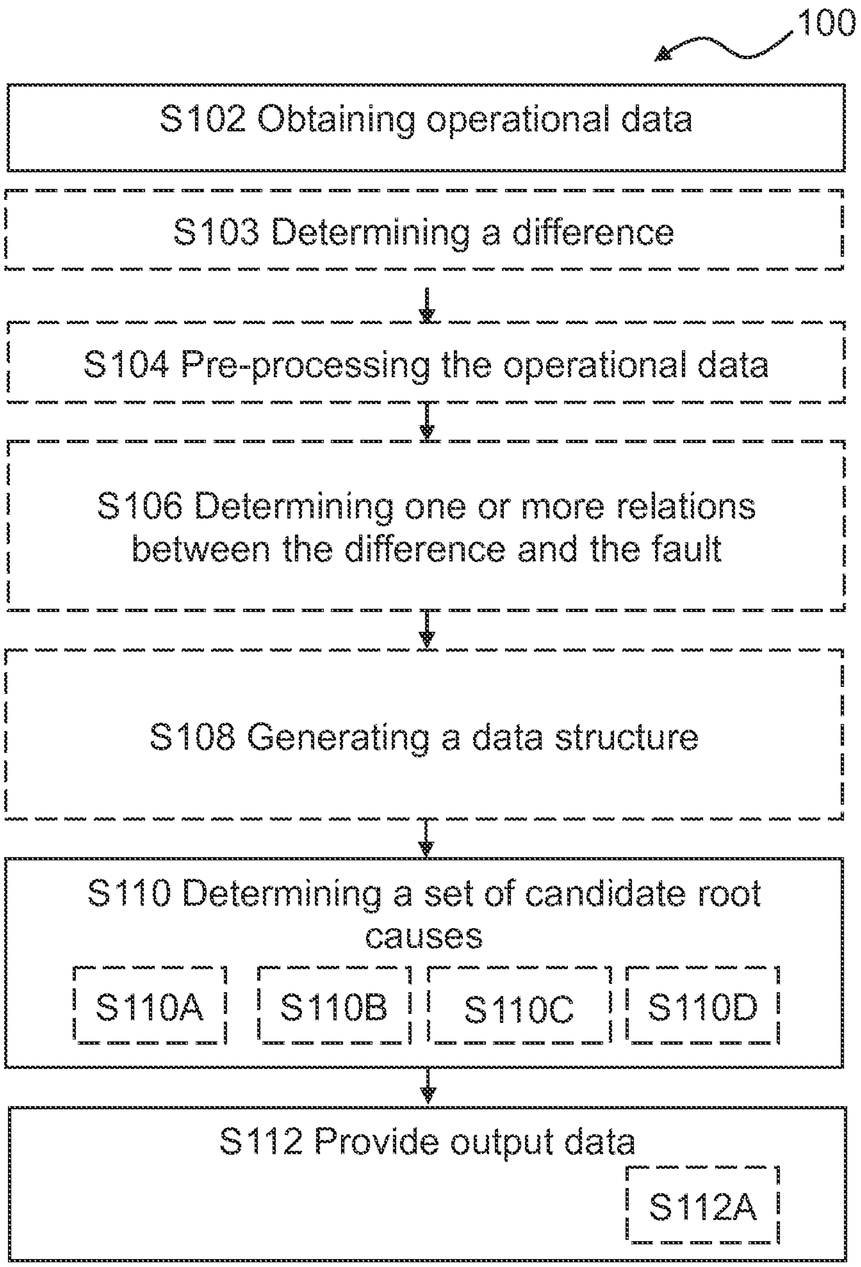
FIG. 4 is a flow-chart illustrating an exemplary method, performed by an electronic device, for controlling operation of a wind turbine according to this disclosure.

FIG. 4 shows a flow diagram of an example method 100 for RCA of a wind turbine system according to the disclosure. The method 100 is performed by an RCA system, such as the RCA system disclosed herein, such as RCA system 300 of FIG. 5. The RCA system may be internal or external to a wind turbine system.

The method 100 comprises obtaining S102 operational data associated with operation of a wind turbine system in response to a fault of the wind turbine system. In one or more example methods, the operational data associated with the wind turbine system comprises one or more of: logs, telemetry data, and configuration data.

For example, obtaining operational data comprises receiving and/or retrieving operational data from components of the wind turbine system. For example, the operational data is received and/or retrieved from one or more repositories associated with the wind turbine system (such as repository 14, 16 of FIG. 1, and/or repository 50 of FIG. 2). For example, telemetry data is received and/or retrieved from one or more components of the wind turbine system (such as one or more sensors, one or more actuators, and/or one or more processes). In some examples, the operational data may be obtained by the RCA system receiving an RCA assistance request including the operational data. In some examples, the RCA system may be configured to obtain the operational data over a local area network and/or a wide area network. The transmission of operational data over a wide area network may carried out using a Virtual Private Network (VPN) (e.g., when the RCA system is running on a remote server). In some examples, the RCA assistance request triggers the RCA system to retrieve the operational data (e.g., logs and/or telemetry data associated with a specific identification number of the wind turbine system associated with the fault). The operational data obtained by the RCA system may comprise operational data obtained before and/or after the moment where the fault of the wind turbine system occurred (e.g., the timestamp of the fault). In some examples, the logs associated with the wind turbine system may be retrieved from the wind turbine system directly and/or retrieved from a centralized logging system. The RCA system may be configured to obtain information indicative of one or more configurations of the wind turbine system from a configuration repository (such as a wind turbine system configuration repository, and/or release package repository). For example, the RCA system may obtain one or more previous configurations and/or one or more recent (such as recently prior to the fault) configurations (e.g., a software configuration A and a software configuration B). For example, the RCA system may be configured to obtain only the necessary (e.g., relevant to the fault) information from the one or more previous configurations.

The method 100 comprises determining S110, based on the operational data, a set of candidate root causes associated with the fault, by applying S110A a machine learning model to the operational data. In some examples, the machine learning model is configured to classify and/or locate one or more candidate root causes of the set.

The method 100 comprises providing S112, based on the set of candidate root causes, output data indicative of at least one root cause of the fault of the wind turbine system. The at least one root cause can be seen as a root cause selected in the set of candidate root causes, such as a most likely root cause. Examples of output data are illustrated in FIGS. 1 and 2. In some examples, providing S112 the output data indicative of at least one root cause of the fault of the wind turbine system comprises transmitting the output data to an internal device of the RCA system for controlling the wind turbine system. In some examples, providing S112 the output data indicative of at least one root cause of the fault of the wind turbine system comprises transmitting the output data to an external device (e.g. an electronic device of a technician) for controlling the wind turbine system. In some examples, providing S112 the output data indicative of at least one root cause of the fault of the wind turbine system comprises controlling the wind turbine system based on the output data. For example, the output data may be used to adjust one or more operations of the wind turbine system and possibly mitigate the fault.

It is an advantage of the present disclosure that the disclosed RCA system learns complex patterns from operational data which are not easily discernable by humans and quickly relates them to root causes, such as previously observed root causes. The RCA system of the present disclosure narrows down the domain of candidate root causes to a set, that can take into account differences in configuration of the wind turbine system.

In one or more example methods, the machine learning model comprises one or more of: a first machine learning model, a second machine learning model, and a third machine learning model. In some examples, the first machine learning model is configured to classify one or more candidate root causes into one or more first root cause categories. In some examples, the second machine learning model is configured to classify one or more candidate root causes into one or more second root cause categories. In some examples, the first machine learning model is one or more of: a neural network model (such as a convolutional neural network in 1D or 2D), a Naïve Bayes model network, a support vector machine model, a random forest model, a k-nearest neighbour model, a regression model, a gradient boosting model, and a decision tree model. In some examples, the second machine learning model is one or more of: a neural network model (such as a convolutional neural network in 1D or 2D), a Naïve Bayes model network, a support vector machine model, a random forest model, a k-nearest neighbour model, a regression model, a gradient boosting model, and a decision tree model. In some examples, the disclosed technique is not limited to a particular type of machine learning model used as first ML model and/or second ML model. In some examples, a neural network model (such as a convolutional neural network in 1D or 2D) may be advantageously applied as first and/or second ML model. In some examples, a gradient boosting model (may be advantageously applied as first and/or second ML model.

In some examples, the third machine learning model is configured to locate one or more candidate root causes, such as components and/or parts of the wind turbine system causing the fault.

In one or more example methods, the first machine learning model has a first order of execution. In one or more example methods, the second and the third machine learning model have a second order of execution lower than the first order. In other words, the first, second- and third-ML models have a hierarchical' organization that is used to order hierarchically the execution of the ML models. A hierarchy between the machine learning model may be predetermined in that the first machine learning model may be executed before the second and/or third machine learning model.

In one or more example methods, the first machine learning model is a first classifier configured to classify the operational data into one or more first root cause categories. In one or more example methods, the second machine learning model is a second classifier configured to classify the operational data into one or more second root cause categories. In some examples, the one or more second root cause categories provide a higher granularity than the one or more first root cause categories. The first ML models (such as first classifiers) may be seen as high-level category models, such as high-level classifiers. The second ML models (such as second classifiers) may be seen as low-level category models in that their granularity is higher than the first ML models.

In one or more example methods, the third machine learning model comprises a graph convolutional network (GCN) configured to locate a candidate root cause based on the operational data. In some examples, the GCN takes as input the operational data and a graph representation of the wind turbine system. In some examples, the GCN outputs candidate root cause(s) over the graph representation. For example, the graph representation is indicative (such as representative) of relation between nodes and/or components of the wind turbine system. For example, nodes and/or components are connected and/or related in the wind turbine system. For example, the graph representation (such as the edges of the graph representation) depicts components (e.g., control components, sensors) and the signals (e.g., control signals, sensor data) associated with the components. The graph representation can for example be seen as a representation of relation, such as the relation between components and/or signals, in a wind turbine system. In other words, the graph representation can be seen as a relation model of nodes and/or components of the wind turbine system. The third machine learning model may be based on the GCN associated with the wind turbine system for locating a candidate root cause based on the operational data.

In one or more example methods, the graph convolutional network is associated with the first classifier and/or the second classifier. In other words, in some examples, the candidate root cause(s) can be determined by applying a GCN associated with a second classifier to the operational data, as illustrated in FIG. 2. In some examples, the candidate root cause(s) can be determined by applying a GCN associated with a first classifier to the operational data. in some examples, the candidate root cause(s) can be determined by applying a first GCN associated with a first classifier and a second GCN associated with a second classifier to the operational data.

For example, the first classifier determines the first root cause category to be "configuration", the GCN associated with the second classifier determines that the second root cause category indicative of a specific configuration of the wind turbine system, e.g., 'Modbus signal latency too high' provides the highest confidence score. For example, the RCA system provides output data indicating that the root cause is 'Modbus signal latency too high'.

In one or more example methods, determining S110 the set of candidate root causes associated with the fault comprises selecting S110B, based on the operational data, the first machine learning model amongst a plurality of first classifiers. In some examples, selecting the first machine learning model is based on the type (e.g., configuration) of wind turbine and/or wind turbine system associated with the fault. The first machine learning model may be selected using a model selector as illustrated in FIG. 2. For example, the RCA system is configured to select the first machine learning model based on the configuration (such as the type) of the wind turbine system for applying the ML model.

In one or more example methods, determining S110 the set of candidate root causes associated with the fault comprises selecting S110C the second classifier based on the selected first classifier. For example, the RCA system is configured to select, based on the selected first machine learning model (e.g., high-level classifier model), a second machine learning model. This may be seen as following a hierarchy that may guide the executing of the second ML model based on the result from the first ML model, e.g. the first root cause category(ies) identified. For example, the same operational data (such as the pre-processed operational data) provided to the first machine learning model may be provided to the second machine learning model. In one or more example methods, determining S110 the set of candidate root causes associated with the fault comprises determining S110D a probability that a candidate root cause of the set of candidate root causes is associated with the fault. For example, the ML model provides a probability score which is a probability for the fault to belong to a given root cause category. This may be applied using the first ML model and/or the second ML model and/or the third model. The probability may be a root cause probability score as illustrated in table 28 FIG. 1 and/or the confidence score as illustrated in table 32 of FIG. 1.

In one or more example methods, providing S112 the output data indicative of at least one root cause of the fault comprises filtering S112A the candidate root causes of the set based on their respective probabilities. For example, filtering the candidate root causes comprises reducing the number of candidate root causes (e.g., such that only k candidate root causes remain, where k is a positive integer). In some examples, filtering the candidate root causes comprises filtering the candidate root causes based on their probability (e.g., root cause probability scores, confidence scores). For example, the RCA system provides in the output data candidate root causes having higher probabilities. In some examples, the RCA system is configured to combine candidate root causes for consistency between candidate root causes. For example, the RCA system may provide as output data a root cause selected from a majority amount of candidate root causes indicative of one or more similar root causes. This may allow reducing noise and/or remove outliers in the output data.

In one or more example methods, the method 100 comprises determining S103 a difference between a first configuration of the wind turbine system and a second configuration of the wind turbine system. In other words, for example, the operational data comprises the first configuration and the second configuration, and the method comprises determining the difference between the first and second configuration. The configuration of the wind turbine system for example comprises hardware configurations (e.g., logs of hardware components at time of fault and/or hardware replacements and/or software configurations (e.g., logs of previous code and/or logs of code at time of fault). For example, a first configuration is a previous configuration, and the second configuration is the current configuration. Determining the difference between the first configuration of the wind turbine system and the second configuration of the wind turbine system may comprise determining one or more changes (e.g., modifications) of the second configuration with respect to the first configuration. In some examples, the difference between the first configuration of the wind turbine system and the second configuration of the wind turbine system can be seen as a delta. The difference can be provided in data structure, such as table 32 of FIG. 2. In other words, determining the difference may comprise obtaining configuration data from a release package repository, the configuration data comprising a first release package and a second release package. For example, the first release package may be indicative of a release package prior to obtaining fault data and the second release package is indicative of a release package during and/or after obtaining fault data. For example, determining the difference comprises determining one or more differences between the first release package and the second release package (e.g., using a rule-based model).

In some examples, the operational data comprises a difference (e.g., a delta) between a first configuration (e.g., previous software package A before the fault) of the wind turbine system and a second configuration (e.g., current software package B) of the wind turbine system.

In one or more example methods, the method comprises determining S106, based on historical operational data and/or the operational data, one or more relations between the difference and the fault. For example, the historical operational data includes historical logs, such as one or more previous events (e.g., a previous alarm and/or a previous warning). For example, the operational data includes logs, such as one or more events (e.g., an alarm and/or a warning). For example, determining, based on historical operational data and/or the operational data, one or more relations between the difference and the fault may comprise analysing historical operational data and/or operational data to determine the relations between the difference and the fault from past operational data and/or current operational data. In some examples, an event is associated with an event code (e.g., a label assigned to an event). For example, the RCA system is configured to relate an object (e.g., a line of code which has been updated/modified) using the difference between two configurations. In some examples, the RCA system is configured to provide the event code for further processing. In some examples, the RCA system is configured to periodically analyse (e.g., periodically scanning) historical operational data and/or operational data to determine the relation(s). The relations can be stored in a data structure, such as a table, associating the difference(s) to e.g. events in a log.

In some examples, the determining of one or more relations between the difference (e.g., a delta) and the fault comprises learning (e.g., offline) the relation between the difference and the event(s) e.g., to construct a table representing the relation and/or association with a link strength, a confidence score and/or a probability. In some examples, a table (e.g., determined offline) comprising the link strengths of events with objects may be used to link (e.g., using the RCA system while online) a difference to an event or event code of the wind turbine system, for example as illustrated by 58 in FIG. 2. In one or more example methods, the method comprises generating S108 a data structure representative of the one or more relations. The data structure for example comprises a confidence score associated each of the one or more relations. In some examples, the method comprises determining a confidence score (e.g., a probability) indicative of a confidence (e.g., a link strength) that a fault is associated with a specific modification of the configuration of the wind turbine system.

In one or more example methods, the operational data comprises fault data associated with the fault of the wind turbine system. In one or more example methods, the fault data comprises information indicative of the wind turbine associated with the fault. The fault data may comprise a timestamp associated with the fault (e.g., information indicative of the time at which a fault was detected). The fault data may comprise an identification number associated with a specific wind turbine. The fault data may comprise an identifier associated with a specific wind turbine and/or a wind turbine farm.

In one or more example methods, the method comprises pre-processing S104 the operational data for application of the machine learning model. This is for example illustrated with the pre-processor 54 in FIG. 2.

In one or more example methods, the machine learning model is trained based on one or more of: fault data, root causes associated with the fault data, relational data associated with the wind turbine, operational data, historical fault data, historical operational data associated with the historical fault data, and root causes associated with the historical fault data. For example, root causes associated with the fault data and/or historical fault data can be seen as providing labels e.g., the associated root cause and optionally root cause nodes in a graph representation. For example, the historical operational data can include historical telemetry data, and/or historical logs. For example, the historical operational data can include historical configuration data, such as configurations and changes in software and/or hardware, e.g. a history of the changes in software and/or hardware of a wind turbine system. The training and/or retraining of the ML model can be carried out by a model trainer, such as model trainer 66 of FIG. 2.

In one or more example methods, the machine learning model is retrained based on updated operational data. Retraining the machine learning model based on updated operational data can for example be seen as updating the machine learning model. In some examples, the wind turbine system is configured to provide operational data (e.g., logs) to a second wind turbine system (e.g., a different system which is functionally the same). In some examples, providing operational data to a second wind turbine system may allow identification of patterns. The RCA system may be configured to retrain and/or update the machine learning model based on the identified patterns. The retraining of the machine learning model may enable a new root cause (e.g., candidate root cause) to be determined. The new determined root cause may improve labelling of the operational data obtained by the RCA system.

It may be envisaged that inference results of the RCA system are continuously monitored, triggering the re-training of ML model(s) in the RCA system. In some examples, retraining of the machine learning model is based on unsupervised learning, e.g. by clustering the operational data based on historical operational data. For example, unsupervised learning techniques can be applied on operational data to determine if new first and/or second root cause categories need to be created.

In some examples, the retraining may be based on manual labelling of the operational data. The retraining may be performed at run time. In some examples, the retraining may be performed in parallel with the run time and the retrained ML model may be reloaded in the RCA system. In some examples, the ML model can be automatically retrained.

In some examples, an RCA system associated with a second wind turbine system can be configured to run a machine learning model that has been (re)trained and has run based on operational data of a first wind turbine system.

Figure 5:
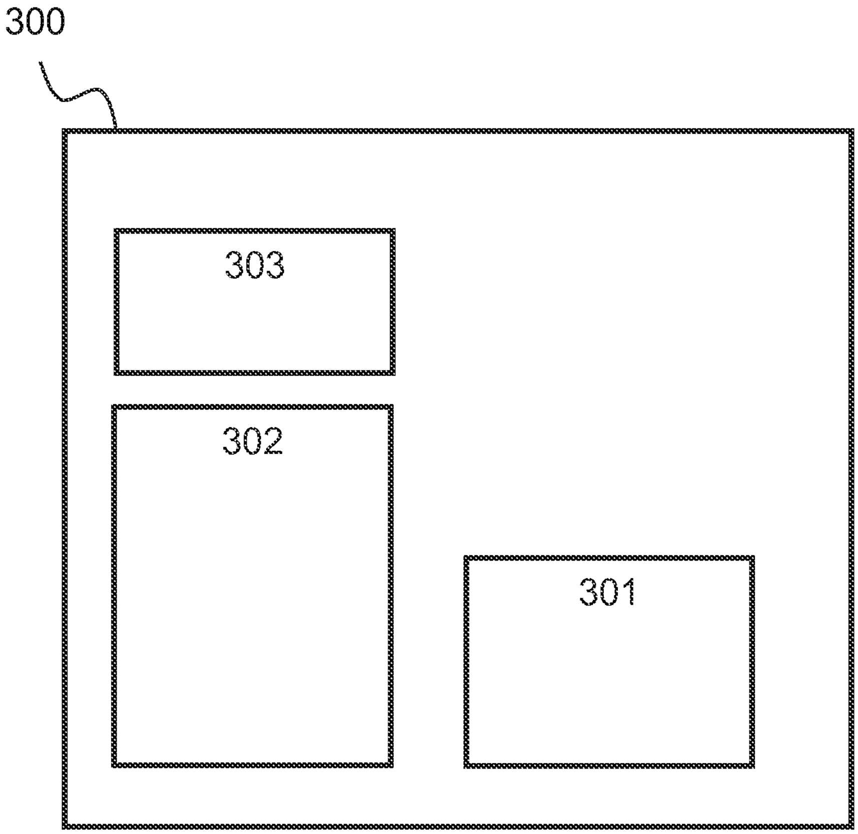
FIG. 5 is a block diagram illustrating an exemplary electronic device according to this disclosure.

FIG. 5 shows a block diagram of an exemplary RCA system 300 according to the disclosure. The RCA system 300 comprises memory circuitry 301, processor circuitry 302, and an interface 303. The RCA system 300 is configured to perform any of the methods disclosed in FIG. 4. In other words, the RCA system 300 is configured for root causes analysis of a wind turbine system.

The RCA system 300 is configured to obtain (e.g., via memory circuitry 301, processor circuitry 302 and/or interface 303) operational data associated with operation of a wind turbine system in response to a fault of the wind turbine system.

The RCA system 300 is configured to determine (e.g., via processor circuitry 302), based on the operational data, a set of candidate root causes associated with the fault, by applying a machine learning model to the operational data. The machine learning model is configured to classify and/or locate one or more candidate root causes. For example, the processor circuitry 302 is configured to execute the machine learning model.

The RCA system 300 is configured to provide (e.g., via the processor circuitry 302 and/or interface 303), based on the set of candidate root causes, output data indicative of at least one root cause of the fault of the wind turbine system.

The processor circuitry 302 is optionally configured to perform any of the operations disclosed in FIG. 4 (such as any one or more of: S102, S103, S104, S106, S108, S110, S110A, S110B, S110C, S110D, S112, S112A). The operations of the RCA system 300 may be embodied in the form of executable logic routines (e.g., lines of code, software programs, etc.) that are stored on a non-transitory computer readable medium (e.g., the memory circuitry 301) and are executed by the processor circuitry 302).

Furthermore, the operations of the RCA system 300 may be considered a method that the RCA system 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random-access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 5). The memory circuitry 301 is considered a non-transitory computer readable medium.

The memory circuitry 301 may be configured to store operational data, historical operational data, fault data, historical fault data, root causes associated with the historical data, first configuration of the wind turbine system, second configuration of the wind turbine system, a set of candidate root causes, one or more candidate root causes, output data, the machine learning model, one or more first root cause categories, one or more second root cause categories, respective probabilities, the difference between a first configuration of the wind turbine system and a second configuration of the wind turbine system, one or more relations between the difference and the fault, the data structure representative of the one or more relations.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method performed by a root cause analysis system, the method comprising:

obtaining, in response to a fault of a wind turbine system, operational data associated with operation of the wind turbine system, wherein the operational data comprises one or more of: one or more logs, telemetry data, and configuration data;

determining, based on the operational data, a set of candidate root causes associated with the fault, wherein determining the set of candidate root causes comprises:

selecting, based on the operational data, a first machine learning (ML) model from a plurality of first classifiers using a model selector;

applying the first ML model to classify the operational data into one or more first root cause categories:

selecting, using the model selector, a second ML model based on the selected first ML model;

applying the second ML model to one of the operational data or output of the first ML model; and aggregating, by a post-processor, outputs of the first ML model and the second ML model to produce the set of candidate root causes;

providing, based on the set of candidate root causes, output data indicative of at least one root cause of the fault of the wind turbine system; and controlling the wind turbine system based on the output data to mitigate the fault.

2. The method according to claim 1, wherein the first ML model has a first order of execution, wherein the second ML model has a second order of execution lower than the first order, such that the first ML model is executed before the second ML model.

3. The method according to claim 1, wherein the second ML model is a second classifier configured to classify the operational data into one or more second root cause categories having a higher granularity than the one or more first root cause categories.

4. The method according to claim 3, further comprising:

providing the first root cause categories and the second root cause categories to a third ML model comprising a graph convolutional network (GCN) configured to output a set of wind turbine system graph nodes indicative of locations of candidate root causes; and locating, using the GCN, a candidate root cause based on the operational data.

5. The method according to claim 4, wherein GCN is based on which first classifier or second classifier is selected.

6. The method according to claim 3, wherein the one or more first root cause categories comprise one or more of: code, hardware, and configuration, and wherein the one or more second root cause categories are indicative of a specific component or parameter of the wind turbine system within the corresponding first root cause category.

7. The method according to claim 1, wherein determining the set of candidate root causes associated with the fault further comprises:

determining a probability that a candidate root cause of the set of candidate root causes is associated with the fault.

8. The method according to claim 7, wherein providing the output data indicative of at least one root cause of the fault comprises;

filtering the candidate root causes of the set based on their respective probabilities.

9. The method according to claim 1, further comprising: determining a difference between a first configuration of the wind turbine system and a second configuration of the wind turbine system.

10. The method according to claim 9, further comprising: determining, based on historical operational data and/or the operational data, one or more relations between the difference and the fault; and generating a data structure representative of the one or more relations.

11. The method according to claim 1, wherein the operational data comprises fault data associated with the fault of the wind turbine system, and wherein the fault data comprises information indicative of the wind turbine associated with the fault.

12. The method according to claim 1, further comprising: pre-processing the operational data to transform the operational data to a format for input to the first ML model and the second ML model.

13. The method according to claim 1, wherein the first machine learning model is trained based on one or more of: fault data, root causes associated with the fault data, relational data associated with the wind turbine, operational data, historical fault data, historical operational data associated with the historical fault data, and root causes associated with the historical fault data.

14. The method according to claim 1, wherein the model selector selects the first ML model from the plurality of first classifiers based on a type of the wind turbine system associated with the fault.

15. The method according to claim 1, further comprising: establishing, by a delta event linker, links between the operational data and one or more differences between a first configuration and a second configuration of the wind turbine system, wherein the aggregating by the post-processor further comprises aggregating the links with the outputs of the first ML model and the second ML model.

16. The method according to claim 15, wherein the links are established using an Event-Object linking table, the Event-Object linking table being learned offline from one or more repositories associated with the wind turbine system.

17. The method according to claim 1, further comprising: retraining one or both of the first ML model and the second ML model based on updated operational data.

18. The method according to claim 1, wherein the aggregating by the post-processor comprises:

combining candidate root causes from the outputs of the first ML model and the second ML model for consistency; and selecting a first root cause of the at least one root cause from a majority of candidate root causes indicative of one or more similar root causes to reduce noise and remove outliers from the output data.

19. A root cause analysis system comprising:

a memory circuitry; and a processor circuitry communicatively coupled to the memory circuitry and configured to perform an operation comprising:

obtain, in response to a fault of a wind turbine system, operational data associated with operation of the wind turbine system, wherein the operational data comprises one or more of: one or more logs, telemetry data, and configuration data;

determine, based on the operational data, a set of candidate root causes associated with the fault, wherein determining the set of candidate root causes comprises:

selecting, based on the operational data, a first machine learning (ML) model from a plurality of first classifiers using a model selector;

applying the first ML model to classify the operational data into one or more first root cause categories;

selecting, using the model selector, a second ML model based on the selected first ML model;

applying the second ML model to one of the operational data or output of the first ML model; and aggregating, by a post-processor, outputs of the first ML model and the second ML model to produce the set of candidate root causes;

provide, based on the set of candidate root causes, output data indicative of at least one root cause of the fault of the wind turbine system; and control the wind turbine system based on the output data to mitigate the fault.

20. A non-transitory computer readable storage medium storing one or more programs, the one or more programs comprising instructions, which when executed by an electronic device cause the electronic device to perform an operation, comprising: obtain, in response to a fault of a wind turbine system, operational data associated with operation of the wind turbine system, wherein the operational data comprises one or more of:

one or more logs, telemetry data, and configuration data;

determine, based on the operational data, a set of candidate root causes associated with the fault, wherein determining the set of candidate root causes comprises:

selecting, based on the operational data, a first machine learning (ML) model from a plurality of first classifiers using a model selector;

applying the first ML model configured to classify the operational data into one or more first root cause categories;

selecting, using the model selector, a second ML model based on the selected first ML model;

applying the second ML model to one of the operational data or output of the first ML model; and aggregating, by a post-processor, outputs of the first ML model and the second ML model to produce the set of candidate root causes;

provide, based on the set of candidate root causes, output data indicative of at least one root cause of the fault of the wind turbine system; and control the wind turbine system based on the output data to mitigate the fault.

* * * * *